United States Patent Office 2,776,813
Patented Jan. 8, 1957

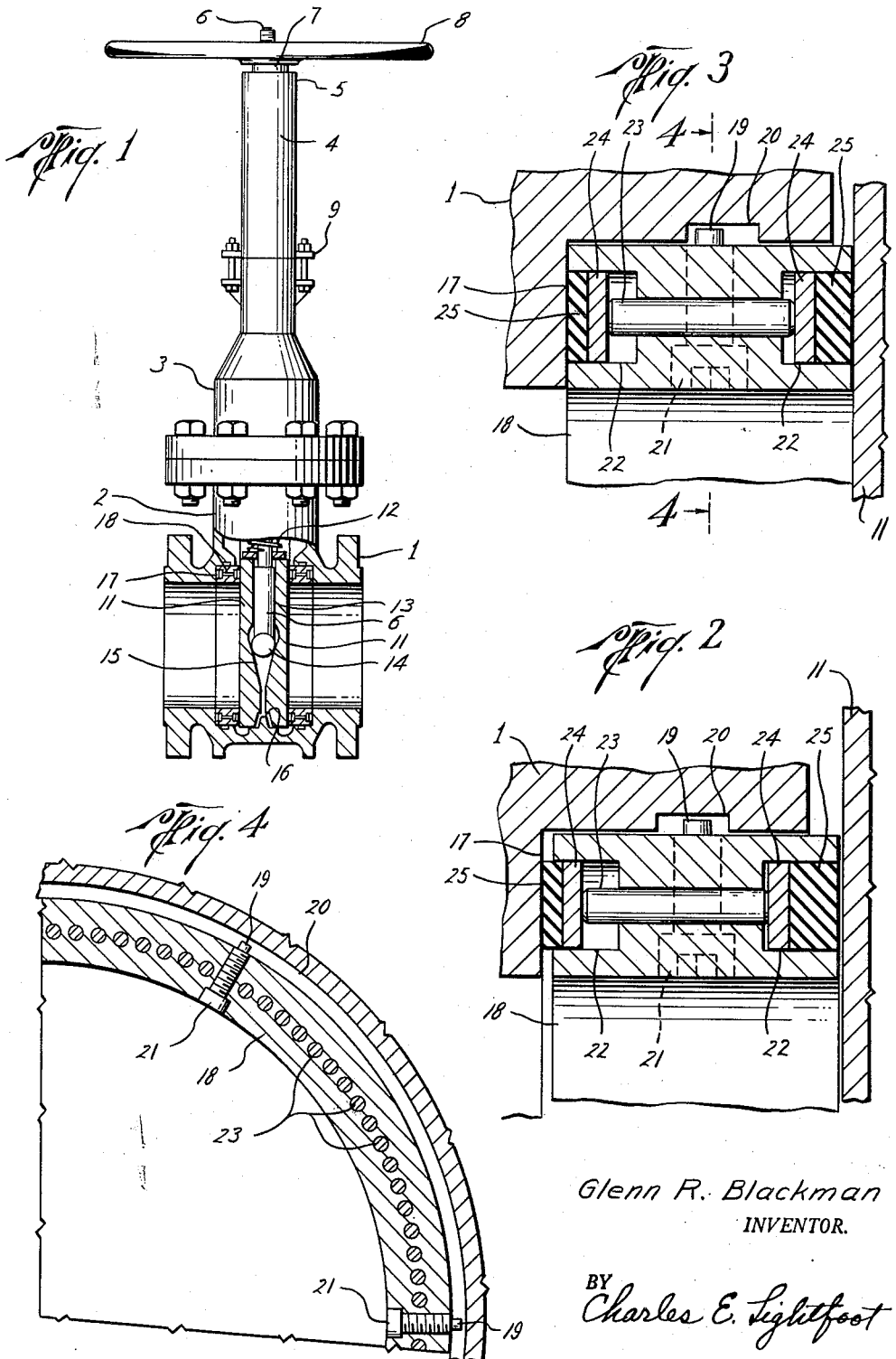

2,776,813

SEAL FOR GATE VALVE

Glenn R. Blackman, South Houston, Tex.

Application August 4, 1955, Serial No. 526,451

4 Claims. (Cl. 251—197)

The invention relates to a seal for gate valve, and it concerns more particularly novel sealing means for a gate valve having expanding gates.

It is an object of the invention to provide a valve of the type described having sealing means which is capable of insuring positive closure, easy operation and long life under severe service conditions.

Another object of the invention is to provide a valve having sealing means of such construction that scoring of the faces of the gates does not destroy the sealing efficiency of the valve.

A still further object of the invention is to provide a valve in which polished, mated seating surfaces are not required, and in which it is not necessary to replace both gates and both seats whenever repairs are necessary.

The invention will be readily understood by referring to the following description and the accompanying drawing, in which:

Figure 1 is an elevational view, partly in section, of a gate valve having expanding gates and having sealing means embodying the invention;

Figure 2 is a fragmentary sectional view, on an enlarged scale, of a portion of the valve shown in Figure 1, showing one of the gates and its sealing means in one of their respective operating positions;

Figure 3 is a view similar to Figure 2, showing the gate and its sealing means in another of their respective operating positions; and Figure 4 is a fragmentary sectional view taken along the line 4—4 of Figure 3 and looking in the direction indicated by the arrows.

Referring to Figure 1 of the drawing, a gate valve is shown which includes a T-shaped body having a horizontally disposed tubular portion 1, the ends of which comprise an inlet and an outlet, respectively, and a vertically disposed tubular portion 2, which is connected to the tubular portion 1 intermediate its ends and extends upwardly therefrom. The ends of the tubular portion 1 are flanged for attachment to a connecting conduit, and the upper end of the tubular portion 2 is flanged for attachment to a bonnet as hereinafter described.

The bonnet includes a vertically disposed tubular end portion 3, which is flanged for attachment to the tubular portion 2 of the body, and a yoke consisting of a pair of elongated upstanding side portions 4, which are each connected at one end to the tubular end portion 3, and an end portion 5 which connects the upper ends of the side portions 4. The side portions 4 are disposed parallel to and spaced apart from each other, and are arranged parallel to the axis of the tubular portion 3 and on opposite sides thereof.

The valve has a rising stem 6, which is disposed partly within the body and extends upwardly through the bonnet. The upper end of the stem 6 is threaded for engagement with an internally threaded bushing 7, which is rigidly connected to a hand wheel 8 and is rotatably mounted in an opening provided therefor in the end portion 5. The stem 6 may be raised or lowered by turning the hand wheel 8. A stuffing box having a packing gland 9, which is positioned between the side portions 4 whereby it is readily accessible, provides a seal between the stem 6 and the tubular end portion 3 of the bonnet.

A pair of gates 11, which are generally planar in shape, are arranged in side by side relation to each other and transversely with respect to the tubular portion 1 of the body. The gates 11 are loosely mounted on the lower end of the stem 6, and may be raised and lowered, upon movement of the stem 6, to open and close the valve. Downward thrust is transmitted from the stem 6 to the gates 11, to close the valve, through a compression spring 12, which surrounds the stem 6 and acts upon the stem 6 and the gates 11, so that the stem 6 is capable of limited longitudinal movement with respect to the gates 11. The lower end of the stem 6 is received in a pair of aligned grooves 13 provided therefor in the opposed surfaces of the gates 11.

A relatively short round bar 14 is disposed transversely with respect to the stem 6 and is rigidly connected intermediate its ends to the lower end thereof. The axis of the bar 14 lies in a plane which is parallel to the planes of the opposed surfaces of the gates 11. The bar 14 is received in a pair of aligned grooves 15, which are formed in the opposed surfaces of the gates 11 and communicate with the lower ends of the grooves 13. The grooves 15 have downwardly and inwardly inclined planar surfaces, which converge adjacent their lower ends, for engagement with the bar 14 whereby the gates 11 may be expanded, or moved outwardly apart from each other, upon moving the bar 14 downwardly in the grooves 15.

Upon closing the valve, the bar 14 remains stationary, due to the action of the spring 12, until the gates 11 are in their lowermost positions, in which they engage a stop 16 in the bottom of the valve. Additional thrust imparted through the stem 6, then overcomes the thrust of the spring 12, and the bar 14 is moved downwardly in engagement with the inclined planar surfaces of the grooves 15 whereby the gates 11 are expanded or moved outwardly apart from each other. The positions of the grooves 15 are such that the gates 11 are expanded or moved outwardly from the center, in a straight line, thus insuring perfect alignment of the gates 11 with their seats as hereinafter described.

Upon opening the valve, the gates 11 are retained in their lowermost positions, due to the action of the spring 12, until the bar 14 reaches its uppermost position with respect to the grooves 15, whereby the gates 11 are retracted, and thereby disengaged from their seats. Thereafter the bar 14 engages a pair of downwardly facing shoulders formed by the upper ends of the grooves 15, whereby the gates 11 are moved upwardly with the stem 6.

A pair of inwardly facing shoulders 17 are formed in the inner wall of the tubular portion 1 of the body, on opposite sides of the gates 11, for engagement, respectively, by a pair of seat rings 18, one of which is loosely positioned between each of the gates 11 and the adjacent shoulder 17.

Referring to Figures 2, 3 and 4 of the drawing, the seat rings 18 are each held in position by a plurality of circumferentially spaced headless set screws 19, which are inserted through openings provided therefor in the seat ring 18 and project radially outwardly therefrom for engagement with an annular groove 20 formed in the inner wall of the tubular portion 1 of the body, whereby the seat ring 18 is loosely retained in engagement with the tubular portion 1 and is capable of limited lateral movement between the shoulder 17 and the line of descent of the gate 11. Clearance is maintained between the gate 11 and its seat until the moment of shut-off, thereby eliminating friction drag as the valve is opened and closed. Headless pipe plugs 21 are inserted in the openings provided in the seat ring 18, after inserting the set screws 19 therein, to prevent leakage.

The seat rings 18 each have a pair of oppositely facing annular grooves 22 formed in the side walls thereof. The grooves 22 are aligned with each other, one of them facing the gate 11 and one facing the shoulder 17. A plurality of closely and circumferentially spaced pins 23 are loosely positioned in openings provided therefor in the seat ring 18, and which extend transversely through the seat ring 18 and communicate with the bottoms of the grooves 22. The pins 23 are capable of limited longitudinal movement with respect to the seat ring 18, as hereinafter described.

A pair of annular plates 24 are received, respectively, in the grooves 22 of each of the seat rings 18. The adjacent sides of the plates 24 abut the ends of the pins 23. The pins 23 are of equal length, and the plates 24 are movable laterally therewith. A pair of annular seats 25, each formed of resilient material, are received, respectively, in the grooves 22 adjacent the outer surfaces of the plates 24. The resilient seats 25 advantageously may be placed in the grooves 22 by separate molding operations. The resilient seats 25 facing the gates 11 are molded flush with the face of the seat ring 18, and are thus fully protected against damage while the valve is open. The resilient seats 25 facing the shoulders 17 extend past the metal of the seat rings 18.

When the valve is closed, the gates 11 move down until they contact the stop 16. At this point, as shown in Figures 1 and 2, the gates 11 and their seats 25 have not yet contacted each other. The spring 12 is holding the bar 14 in an inactive position with respect to the gates 11, and the seats 25 are floating in the seat ring 18. Thus friction, and the damage which would be caused by moving the gates 11 across the seats 25 under high pressure, is eliminated.

After the gates reach the stop 16, additional thrust imparted through the hand wheel 8 overcomes the thrust of the spring 12, and the bar 14 moves down the inclined planar surfaces of the grooves 15 and expands the gates 11 straight out toward the adjacent seat rings 18. As contact is made between the gates 11 and the adjacent seat rings 18, the seat rings 18 are moved back until the projecting resilient seats 25 come in contact with the adjacent shoulders 17 of the body, effecting pressure seals at these points.

As the seat rings 18 continue to move back, the pins 23 in the seat rings 18 begin to move forward, thus causing the adjacent resilient seats 25 to flow forward against the gates 11. When the final seal is made, as shown in Figure 3, metal to metal contact exists between the gates 11 and the seat rings 18, and between the seat rings 18 and the shoulders 17, with the resilient seats 25 fully enclosed on both sides and effecting a positive seal under the high mechanical pressure exerted by the pins 23.

This design prevents high pressures from blowing out the resilient seats 25. It also permits a complete pressure seal even when foreign matter lodges between the gates 11 and the seat rings 18, since the pressure generated by the pins 23 will cause the resilient seats 25 to flow around such matter.

The invention may be modified in various ways without departing from the spirit and scope thereof.

Having thus clearly shown and described the invention, what is claimed as new and desired to secure by Letters Patent is:

1. In a gate valve having a flowway and a pair of oppositely facing gates carried by a rising stem for movement therewith into and out of a position to close the flowway and means acted upon by the stem for expanding the gates outwardly apart from each other upon completion of the closing movement of the gates, inwardly facing shoulders being formed in the valve body surrounding the flowway on opposite sides of the pair of gates, sealing means comprising a seat-ring loosely positioned between each of the gates and the adjacent shoulder and capable of limited lateral movement between the shoulder and the line of descent of the gate, connecting means loosely positioned in openings provided therefor in each seat-ring and which extend transversely through the seat-ring, the connecting means being capable of limited longitudinal movement with respect to the seat-ring, and a pair of resilient annular seats carried by each of the seat-rings, the resilient seats of each pair being positioned on opposite sides of the seat-ring and being acted upon by the connecting means whereby each pair of the seats may be moved laterally as a unit.

2. In a gate valve having a flowway and a pair of oppositely facing gates carried by a rising stem for movement therewith into and out of a position to close the flowway and means acted upon by the stem for expanding the gates outwardly apart from each other upon completion of the closing movement of the gates, inwardly facing shoulders being formed in the valve body surrounding the flowway on opposite sides of the pair of gates, sealing means comprising a seat-ring loosely positioned between each of the gates and the adjacent shoulder and capable of limited lateral movement between the shoulder and the line of descent of the gate, a plurality of closely and circumferentially spaced pins loosely positioned in openings provided therefor in each seat-ring and which extend transversely through the seat-ring, the pins being capable of limited longitudinal movement with respect to the seat-ring, an annular plate positioned on each side of each seat ring and abutting the ends of the pins thereof, the pins being of equal length and the plates being movable laterally therewith, and a resilient annular seat bonded to and positioned adjacent the outer surface of each of said plates.

3. In a gate valve having a flowway and a pair of oppositely racing gates carried by a rising stem for movement therewith into and out of a position to close the flowway and means acted upon by the stem for expanding the gates outwardly apart from each other upon completion of the closing movement of the gates, inwardly facing shoulders in the valve body on opposite sides of the pair of gates and surrounding the flowway, sealing means comprising a seat-ring loosely positioned between each of the gates and the adjacent shoulder and capable of limited lateral movement between the shoulder and the line of descent of the gate, each seat-ring having an annular groove formed in each side thereof, the grooves of each ring being aligned with each other and one of the grooves of each ring facing one of the gates and other of the grooves of each ring facing the adjacent shoulder, a plurality of closely and circumferentially spaced pins loosely positioned in openings provided therefor in each seat-ring and which extend transversely through the seat-ring and communicate with the bottoms of the grooves, the pins being capable of limited longitudinal movement with respect to the seat-ring, an annular plate movably positioned in each groove, the adjacent sides of the plates of each ring abutting the ends of the pins thereof, the pins being of equal length and the plates being movable laterally therewith, and a resilient annular seat bonded to each plate and positioned in the groove adjacent the outer surface of the plate.

4. In a gate valve having a flowway and a pair of oppositely facing gates carried by a rising stem for movement therewith into and out of a position to close the flowway and means acted upon by the stem for expanding the gates outwardly apart from each other upon completion of the closing movement of the stem, inwardly facing shoulders being formed in the valve body on opposite sides of the pair of gates and surrounding the flowway, sealing means comprising a seat-ring loosely positioned between each of the gates and the adjacent shoulder and capable of limited lateral movement between the shoulder and the line of descent of the gate, each ring having an annular groove formed in each side thereof, the grooves of each ring being aligned with each other, one groove of each ring facing one of the gates and the other groove of each ring facing the adjacent shoulder, a plurality of closely and circumferentially spaced pins loosely positioned in openings provided therefor in each seat-ring and which extend transversely through the ring and communicatte with the bottoms of the grooves, the pins being capable of limited longitudinal movement with respect to the ring, an annular plate movably positioned in each groove, the adjacent sides of the plates of each ring abutting the ends of the pins thereof, the pins being of equal length and the plates being movable laterally therewith, and a resilient annular seat bonded to each of the plates and positioned in the groove adjacent the outer surface of the plate, the seats facing the gates being flush with the face of the ring and being protected against damage while the valve is open, and the resilient seats facing the shoulders extending past the seat-rings.

References Cited in the file of this patent
UNITED STATES PATENTS

| | | |
|---|---|---|
| 2,157,526 | Chaney | May 9, 1939 |
| 2,194,261 | Allen | Mar. 19, 1940 |
| 2,203,989 | Homer | June 11, 1940 |